United States Patent Office 3,030,367
Patented Apr. 17, 1962

3,030,367
N'-SUBSTITUTED DERIVATIVES OF N-(2-METH-OXYPHENYL) PIPERAZINE
Paul A. J. Janssen, Vosselaar, near Turnhout, Belgium, assignor to Research Laboratorium Dr. C. Janssen, N.V., Beerse, Belgium, a company of Belgium
No Drawing. Filed Feb. 24, 1961, Ser. No. 91,323
7 Claims. (Cl. 260—268)

This invention relates to N'-substituted derivatives of N-(2-methoxyphenyl)piperazine. More particularly, this invention relates to products of the formula

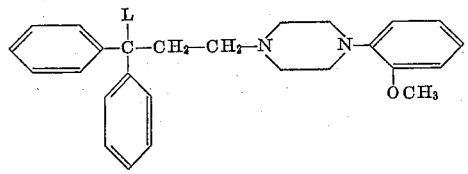

wherein L represents a member of the group consisting of —CONH₂, —CO(lower alkyl) and

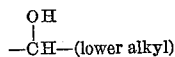

The organic bases of the foregoing type form pharmaceutically useful non-toxic salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

In the preparation of the compounds of this invention, 1-(2-methoxyphenyl)piperazine is refluxed with 2,2-diphenyl-4-bromobutyronitrile. The product of the above reaction is 2,2-diphenyl-4-[4-(2-methoxyphenyl)piperazine]butyronitrile which can be hydrolyzed to the corresponding amide, 2,2-diphenyl-4-[4-(2-methoxyphenyl)-piperazine]butyramide by heating with sulfuric acid.

Alternatively, the nitrile obtained as an intermediate above can be reacted with a Grignard reagent such as RMgX to give, after hydrolysis, the corresponding ketone having the following formula

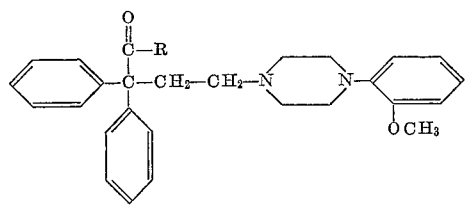

wherein R is lower alkyl. Reduction of these ketones in tetrahydrofuran with lithium aluminum hydride yields the corresponding alcohols having the formula

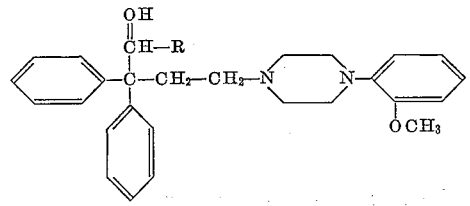

wherein R is defined as above.

The compounds of this invention are useful because of their pharmacological properties. They show activity as analgesics and are also useful as appetite inhibitors.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

Example 1

A mixture of 345 parts of 2,2-diphenyl-4-bromobutyronitrile, 218 parts of 1-(2-methoxyphenyl)piperazine, 360 parts of sodium carbonate, 1 part of potassium iodide and 1600 parts of 4-methyl-2-pentanone is stirred and refluxed for 72 hours. The reaction mixture is filtered and the filtrate is evaporated. The residue is dissolved in a mixture of 320 parts of benzene and 120 parts of acetone and hydrogen chloride gas is introduced into the solution to give the hydrochloride. To liberate the free base 200 parts of the hydrochloride is dissolved in water. The resultant solution is alkalized and extracted with toluene. The organic layer is dried and evaporated and the residue is first washed with 160 parts of petroleum ether and subsequently washed with ether. It is dried overnight at 45° C. to give 2,2-diphenyl-4-[4-(2-methoxyphenyl)piperazine]butyronitrile melting at about 94–95° C.

Example 2

An aqueous solution of 29.5 parts of 1-(2-methoxyphenyl)piperazine hydrochloride is alkalized with sodium hydroxide. The resultant solution is saturated with potassium carbonate and extracted with benzene. The benzene is dried over potassium carbonate and filtered. To the filtrate are added 32 parts of sodium carbonate and a few crystals of potassium iodide. Subsequently a solution of 42 parts of 2,2-diphenyl-4-bromobutyronitrile in 80 parts of toluene is added with vigorous stirring and the mixture is refluxed for 60 hours. After cooling the reaction mixture, 100 parts of water is added. The organic layer is separated, dried over potassium carbonate, and filtered, and hydrogen chloride gas is introduced into the filtrate to precipitate the hydrochloride. The crude hydrochloride is dissolved in a mixture of 480 parts of 2-propanol and 200 parts of methanol and filtered. The filtrate is cooled overnight at room temperature to yield 2,2-diphenyl-4-[4-(2-methoxyphenyl)piperazine]-butyronitrile dihydrochloride melting at about 231.5–233° C.

Example 3

After the dropwise addition of 4.5 parts of 2,2-diphenyl-4-[4-(2-methoxyphenyl)piperazine]butyronitrile dihydrochloride to 7 parts by volume of a mixture of sulfuric acid and water (10:1 by volume) at room temperature, the mixture is heated for 3 hours on a steam bath. The reaction mixture is allowed to cool before it is poured into an excess of ammonia and crushed ice. After extraction of the mixture with chloroform, the organic layer is dried over potassium carbonate and evaporated. The solid residue is triturated in 24 parts of diisopropyl ether and 8 parts of acetone. The resultant precipitate is filtered and dried before recrystallization from a mixture of 80 parts of acetone and 60 parts of 2-propanol. 2,2-diphenyl-4-[4-(2-methoxyphenyl)piperazine]butyramide melting at about 185.6–188° C. is obtained by

3 cooling the filtrate at —20° C. The product has the formula

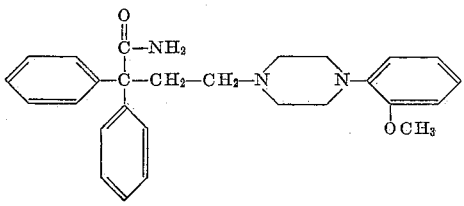

Example 4

A solution of methylmagnesium iodide is prepared from 12.7 parts of magnesium and 72 parts of methyl iodide in 280 parts of anhydrous ether. The mixture is heated to 65° C. and a solution of 80 parts of 2,2-diphenyl-4-[4-(2-methoxyphenyl)piperazine]butyronitrile in 320 parts of toluene is added portionwise. The mixture is refluxed for 16 hours at a temperature of about 96° C. After cooling the mixture, 500 parts of 20% hydrochloric acid is added carefully at a temperature of about 20–30° C. to decompose the reaction mixture. The organic layer is separated and the acidic aqueous solution is refluxed for 5 hours. The precipitate which forms is filtered off and dissolved in hot water. The aqueous solution is made alkaline with sodium hydroxide solution and extracted with a mixture of chloroform and 4-methyl-2-pentanone. The organic layer is dried over sodium sulfate and evaporated and the oily residue is dissolved in a mixture of 80 parts of ether and 320 parts of petroleum ether. On cooling this solution at room temperature an oil separates. After decantation of the solvent the oil solidifies to yield 3,3-diphenyl-5-[4-(2-methoxyphenyl)piperazine]-2-pentanone melting at about 121–123.8° C. This product has the formula

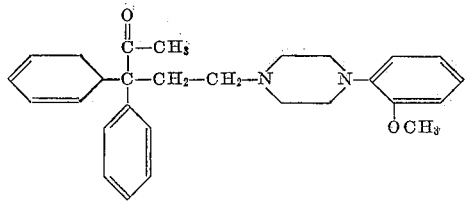

Example 5

To a solution of ethylmagnesium bromide prepared from 7.32 parts of magnesium, 38.3 parts of ethyl bromide and 160 parts of ether is added portionwise a solution of 62 parts of 2,2-diphenyl-4-[4-(2-methoxyphenyl)-piperazine]-butyronitrile in 320 parts of toluene at a temperature of 56° C. After the addition is complete the mixture is refluxed for 20 hours. The reaction mixture is cooled and 400 parts of 20% hydrochloric acid is added. After separation of the organic layer, the remaining aqueous solution together with the separated oil is refluxed for 8.5 hours. The mixture is cooled and the acidic aqueous layer is decanted from the oil. The oily residue is dissolved in warm water and the resultant aqueous solution is made alkaline before extraction with toluene. The organic layer is dried over potassium carbonate and the solvent is evaporated. After dissolving the oily residue in a mixture of 160 parts of acetone and 40 parts of ether, hydrogen chloride gas is introduced into the solution. Crude monohydrochloride is obtained by cooling the solution at 0° C. The free base is liberated from this salt by dissolving it in water and alkalizing the resultant solution. The mixture is extracted with ether and the ether solution is dried. Hydrogen chloride gas is introduced into the solution and the precipitated dihydrochloride is recrystallized twice, first from a mixture of acetone, 2-propanol and ether and then from a mixture of ethanol and ether. This gives 4,4-diphenyl-6-[4-(2-methoxyphenyl)piperazine]-3-hexanone which melts at about 118–137° C. with decomposition.

Example 6

To a stirred solution of 6.42 parts of 3,3-diphenyl-5-[4-(2-methoxyphenyl)piperazine]-2-pentanone in 120 parts of tetrahydrofuran is added portionwise 0.51 part of lithium aluminum hydride at a temperature of 25–32° C. Stirring is continued for 15 hours at room temperature. After cooling, the reaction is diluted with 20 parts of water and the organic layer is evaporated. Dilute sodium hydroxide solution is added to the residue and the mixture is extracted with chloroform. It is necessary to neutralize the mixture with dilute hydrochloric acid in order to obtain a clean separation. The organic layer is separated and washed with ammonium hydroxide solution. After drying the chloroform solution over sodium sulfate and potassium carbonate, the solvent is evaporated and the residue is dissolved in 80 parts of boiling ether. The resultant solution is cooled to room temperature and the ether is allowed to evaporate slowly. The solid which separates is filtered and washed with acetone to give 3,3-diphenyl-5-[4-(2-methoxyphenyl)-piperazine]-2-pentanol melting at about 129–131° C. This product has the following formula

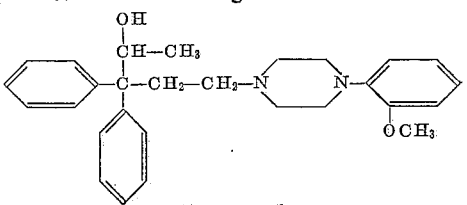

Example 7

At a temperature of 25–32° C., 0.51 part of lithium aluminum hydride is added portionwise to a stirred solution of 6.63 parts of 4,4-diphenyl-6-[4-(2-methoxyphenyl)piperazine]-3-hexanone in 120 parts of tetrahydrofuran. Stirring is continued for 13 hours at room temperature. With cooling, the reaction mixture is diluted with 20 parts of water. After evaporation of the organic layer, dilute sodium hydroxide solution is added to the residue and the resultant solution is neutralized with dilute hydrochloric acid and extracted with chloroform. The chloroform layer is dried and the solvent is evaporated. The residue is recrystallized from boiling ether. After further recrystallization from a mixture of benzene and ether there is obtained 4,4-diphenyl-6-[4-(2-methoxyphenyl)-piperazine]-3-hexanol.

What is claimed is:
1. A compound of the formula

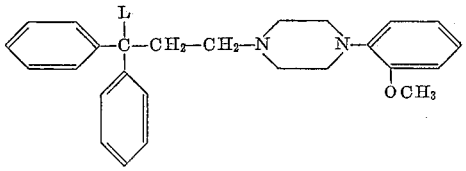

wherein L represents a member of the group consisting of —CONH$_2$, —CO(lower alkyl) and

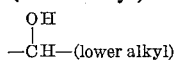

2. 2,2 - diphenyl - 4-[4-(2-methoxyphenyl)piperazine]-butyramide.
3. A compound of the formula

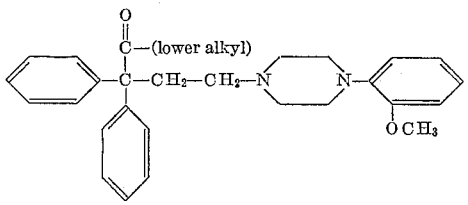

4. 3,3 - diphenyl - 5-[4-(2-methoxyphenyl)piperazine]-2-pentanone.
5. 4,4 - diphenyl - 6-[4-(2-methoxyphenyl)piperazine]-3-hexanone.

6. A compound of the formula
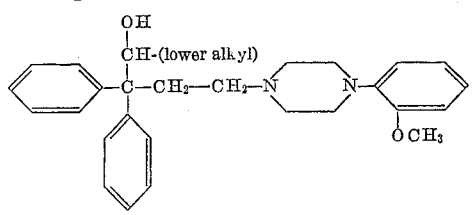
7. 3,3 - diphenyl - 5-[4-(2-methoxyphenyl)piperazine]-2-pentanol.
References Cited in the file of this patent
UNITED STATES PATENTS
| | | |
|---|---|---|
| 2,575,122 | Pollard et al. | Nov. 13, 1951 |
| 2,899,436 | Morren | Aug. 11, 1959 |
| 2,946,793 | Michaels et al. | July 26, 1960 |